United States Patent
Wieckhorst et al.

(10) Patent No.: US 12,527,241 B2
(45) Date of Patent: Jan. 20, 2026

(54) SYSTEM AND METHOD TO MEASURE AN ABSOLUTE WORKING HEIGHT OF A PLURALITY OF AGRICULTURAL ATTACHMENTS

(71) Applicant: CLAAS Tractor SAS, Vélizy-Villacoublay (FR)

(72) Inventors: Jan Carsten Wieckhorst, Uelzen Ortsteil Hanstedt (DE); Christian Birkmann, Versmold (DE); Christian Schaub, Paderborn (DE); Jona Pieper, Nordkirchen (DE); Lennart Meyer, Aachen (DE)

(73) Assignee: CLAAS Tractor SAS, Vélizy-Villacoublay (FR)

( * ) Notice: Subject to any disclaimer, the term of this patent is extended or adjusted under 35 U.S.C. 154(b) by 595 days.

(21) Appl. No.: 17/880,909

(22) Filed: Aug. 4, 2022

(65) Prior Publication Data
US 2023/0045992 A1    Feb. 16, 2023

(30) Foreign Application Priority Data
Aug. 10, 2021   (DE) ............... 10 2021 120 759.2

(51) Int. Cl.
| | | |
|---|---|---|
| A01B 63/111 | (2006.01) | |
| A01B 63/00 | (2006.01) | |
| A01B 63/114 | (2006.01) | |

(52) U.S. Cl.
CPC ........ *A01B 63/1115* (2013.01); *A01B 63/114* (2013.01)

(58) Field of Classification Search
CPC . A01B 63/1115; A01B 63/114; A01B 63/008; A01B 63/1112; A01B 76/00
See application file for complete search history.

(56) References Cited

U.S. PATENT DOCUMENTS

| | | |
|---|---|---|
| 4,600,060 A | 7/1986 | Winter et al. |
| 6,041,582 A | 3/2000 | Tiede et al. |

(Continued)

FOREIGN PATENT DOCUMENTS

| | | |
|---|---|---|
| CN | 108717261 A | 10/2018 |
| DE | 102010031344 A1 | 1/2012 |

(Continued)

OTHER PUBLICATIONS

European Search Report for European application No. 22168336.0-1105/4133920 mailed Jan. 2, 2023.

*Primary Examiner* — David P. Merlino
*Assistant Examiner* — Mahmoud M Kazimi
(74) *Attorney, Agent, or Firm* — Lempia Summerfield Katz LLC (57) ABSTRACT

A method and system for measuring a working height, such as an absolute working height, of a plurality of agricultural attachments using a sensor assembly is disclosed. The sensor assembly includes a sensor and at least one sensor holder. The sensor holder is mounted at mounting positions onto different attachments, with the sensor being reversibly mounted in the sensor holder at the mounting position. The sensor, in a mounted state, records measured data relating to a working height of the agricultural attachment and transmits the measured data to the control assembly. In turn, the control assembly determines the working height of the particular attachment from a calibration data set specific to the mounting position.

20 Claims, 3 Drawing Sheets

(56) References Cited

U.S. PATENT DOCUMENTS

| | | | |
|---|---|---|---|
| 6,076,611 A * | 6/2000 | Rozendaal | A01B 63/32 |
| | | | 172/474 |
| 6,791,488 B2 | 9/2004 | Diekhans | |
| 8,909,435 B2 * | 12/2014 | Tuttle | A01C 7/208 |
| | | | 701/50 |
| 10,085,372 B2 | 10/2018 | Noyer | |
| 10,462,957 B2 | 11/2019 | Clement et al. | |
| 10,517,238 B2 * | 12/2019 | Sporrer | A01G 25/097 |
| 2008/0257570 A1 * | 10/2008 | Keplinger | A01B 63/145 |
| | | | 172/7 |
| 2010/0217474 A1 | 8/2010 | Baumgarten | |
| 2010/0287900 A1 | 11/2010 | Ringwald et al. | |
| 2010/0332071 A1 | 12/2010 | Kato | |
| 2012/0198832 A1 | 8/2012 | Fukumoto | |
| 2013/0116896 A1 | 5/2013 | Blank | |
| 2013/0248212 A1 * | 9/2013 | Bassett | A01C 7/205 |
| | | | 172/4 |
| 2016/0071223 A1 | 3/2016 | Rupp et al. | |
| 2016/0159367 A1 | 6/2016 | Singh et al. | |
| 2016/0221446 A1 | 8/2016 | Suzuki et al. | |
| 2017/0101103 A1 | 4/2017 | Foster et al. | |
| 2017/0313318 A1 | 11/2017 | Heindl et al. | |
| 2017/0315555 A1 | 11/2017 | Sugumaran et al. | |
| 2017/0325394 A1 | 11/2017 | Clement et al. | |
| 2017/0325395 A1 | 11/2017 | Noyer et al. | |
| 2018/0084709 A1 | 3/2018 | Wieckhorst | |
| 2018/0120133 A1 | 5/2018 | Blank et al. | |
| 2018/0238015 A1 | 8/2018 | Fey | |
| 2019/0050947 A1 | 2/2019 | Araki et al. | |
| 2019/0059223 A1 | 2/2019 | Seiders, Jr. | |
| 2019/0254223 A1 | 8/2019 | Eichhorn et al. | |
| 2019/0301143 A1 | 10/2019 | Miller et al. | |
| 2019/0343044 A1 | 11/2019 | Bormann et al. | |
| 2019/0364734 A1 | 12/2019 | Kriebel et al. | |
| 2019/0376920 A1 | 12/2019 | Puhalla et al. | |
| 2019/0392719 A1 | 12/2019 | Parker | |
| 2020/0093053 A1 | 3/2020 | Ehlert et al. | |
| 2020/0337204 A1 | 10/2020 | Hertzog et al. | |
| 2020/0367420 A1 | 11/2020 | Hertzog et al. | |
| 2021/0046917 A1 | 2/2021 | Ehlert et al. | |
| 2021/0092892 A1 * | 4/2021 | Pregesbauer | A01B 63/1112 |
| 2022/0030756 A1 | 2/2022 | Vennemann | |
| 2022/0125032 A1 | 4/2022 | Ascherl | |
| 2022/0132723 A1 | 5/2022 | Anderson | |
| 2022/0369558 A1 | 11/2022 | Scharmann et al. | |

FOREIGN PATENT DOCUMENTS

| | | |
|---|---|---|
| DE | 102014106775 A1 | 11/2015 |
| DE | 102017116593 A1 | 1/2019 |
| DE | 102018203245 A1 | 9/2019 |
| DE | 102018111076 A1 | 11/2019 |
| DE | 102018123480 A1 | 3/2020 |
| DE | 102018124705 A1 | 4/2020 |
| DE | 102019122114 A1 | 2/2021 |
| DE | 102019125896 A1 | 4/2021 |
| EP | 2583543 A1 | 4/2013 |
| EP | 2944171 A1 | 11/2015 |
| EP | 3305053 A1 | 4/2018 |
| EP | 3342264 A1 | 7/2018 |
| EP | 3434087 A1 | 1/2019 |
| EP | 3578032 A1 | 12/2019 |
| EP | 3626038 A1 | 3/2020 |
| EP | 3729939 A1 | 10/2020 |
| EP | 3871481 A1 | 9/2021 |
| JP | S61256215 A | 11/1986 |
| WO | 2012102667 A1 | 8/2012 |
| WO | 2016078782 A1 | 5/2016 |
| WO | 2019158454 A1 | 8/2019 |
| WO | 2020167934 A1 | 8/2020 |

* cited by examiner

SYSTEM AND METHOD TO MEASURE AN ABSOLUTE WORKING HEIGHT OF A PLURALITY OF AGRICULTURAL ATTACHMENTS

CROSS REFERENCE TO RELATED APPLICATION

This application claims priority under 35 U.S.C. § 119 to German Patent Application No. DE 10 2021 120 759.2 filed Aug. 10, 2021, the entire disclosure of which is hereby incorporated by reference herein. This application is further related to: U.S. Utility application Ser. No. 17/880,917; U.S. Utility application Ser. No. 17/880,913; U.S. Utility application Ser. No. 17/880,906; U.S. Utility application Ser. No. 17/880,904; U.S. Utility application Ser. No. 17/880,900, each of which are incorporated by reference herein in their entirety.

TECHNICAL FIELD

The invention relates to a method to measure an absolute working height of a plurality of agricultural attachments, a sensor assembly to measure an absolute working height of a plurality of agricultural attachments, an agricultural combination, an agricultural fleet, a sensor holder, a distance sensor for use as a sensor in a sensor assembly, and an antenna module.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Agricultural production machines such as combines, forage harvesters, and tractors may be combined with various attachments. These attachments are attached via an equipment interface to the agricultural production machine. In one instance, agricultural combinations are formed by combining an agricultural production machine and an agricultural attachment. The agricultural attachment may be an independent vehicle that may be pulled or moved by the agricultural production machine.

Such attachments generally serve to perform an agricultural job, such as fieldwork. Fieldwork may, for example, be a sowing or a fertilization processes, the application of pesticides, working the soil like plowing, or harvesting processes like mowing. Common to these types of fieldwork is that the agricultural attachments are generally adjusted to a specific working height. The working height may for example also assume a negative value, for example in case of plowing where the height is below the ground, and may therefore be a working depth. The success, and to an extent the energy consumption of the fieldwork, frequently depends largely on the working height. At the same time, the working height may depend on various machine parameters of the agricultural attachment and/or the agricultural production machine.

When plowing, for example, the working height depends, on the one hand, on parameters that are manually adjusted on the plow by the user depending on the plow, and on the other hand on settings of the equipment interface on the agricultural production machine. Moreover, an axial load and tire pressure of the agricultural production machine may have an indirect influence on the working depth of the plow via the tire suspension.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

As discussed above, the working depth of modern plows may, in principle, be adjusted somewhat, such as by hydraulic cylinders. However, the needed measured data to specifically make or determine the settings for the adjustments is absent. There are similar problems with other agricultural attachments.

In practice, various types of regulation may be used for fieldwork, such as any one, any combination, or all of traction regulation, slip regulation, position regulation, or mixed regulation of traction and position regulation. The working height may automatically be adjusted in the process, wherein an attempt may be made, however, to keep the working height more or less constant. Machine parameters of the agricultural production machine, such as the tire pressure, are normally not taken into account. Only a relative working height measurement may therefore be used. This relative measurement of the working height refers to the agricultural production machine in some known systems. In known systems (WO 2019/158454 A1), the working height or working depth is measured relative to the agricultural attachment itself.

Therefore, it is a challenge to generally improve fieldwork, and to create an economical option for measuring an absolute working height. Thus, in one or some embodiments, the disclosure may achieve further improvement or optimization with respect to the aforementioned challenge.

In one or some embodiments, a method and system for measuring a working height, such as an absolute working height, of a plurality of agricultural attachments using a sensor assembly having a sensor and at least one sensor holder. The at least one sensor holder (such as multiple sensor holders) may be attached, such as irreversibly attached, at respective mounting positions on a plurality of different attachments. The sensor, via the at least one sensor holder, may then be reversibly mounted at the respective mounting position on different attachments. The sensor, in the mounted state, records measured data relating to a working height of the agricultural attachment, and transmits at least a part (or all) of the measured data to the control assembly. In turn, the control assembly determines the working height of the particular attachment (e.g., the particular attachment have the at least one sensor holder mounted at the respective mounting position thereon) from a calibration data set specific to the mounting position. In this regard, a dedicated working height sensor may be used to determine the working height of a plurality of agricultural attachments. This sensor, reversibly mounted in the sensor holder, avoids the problem that a dedicated working height sensor system must have for each agricultural attachment. In this regard, the sensor holder may include a mechanical connector configured to: (i) reversibly mechanically connect with a sensor; and (ii) be irreversibly attached (or more permanently attached) to an agricultural attachment. Otherwise, the sensor system might be too expensive to provide if the entire sensor system must be installed in each of several agricultural attachments. Instead, using the control assembly, the working height of the particular attachment may be determined from a mounting-position-specific calibration data set (e.g., with an individual sensor, the working height of different attachments may be determined). Since in the present case, the absolute working height is determined, the varied influence of the machine parameters of the agricultural production machine and the agricultural attachment are left out. This may allow for easy documentation, information, controlling or regulation of the actual working height instead of a surrogate parameter.

In one or some embodiments, mounting-position-specific calibration data sets (e.g., a calibration data set that is specific to a particular mounting position) may include any one, any combination, or all of: a reference height; an orientation of the sensor; and a location of the mounting position relative to the agricultural attachment. This information may be particularly suitable for determining the working height of the particular attachment therefrom.

In one or some embodiments, the mounting-position-specific calibration data sets are saved in a memory of the control assembly. In one or some embodiments, the calibration data sets relate to mounting positions of at least two, or at least three, different types of agricultural attachments and may be saved in the memory. Various types of agricultural attachments are contemplated. For example, the different types of agricultural attachments may comprise at least one type of soil cultivation device (e.g., at least two types of soil cultivation devices; the types of soil cultivation devices may comprise any one, any combination, or all of: a plow; a cultivator; or a harrow). Alternatively, or in addition, the agricultural attachments may include different types of agricultural attachments such as any one, any combination, or all of: a seeder; an artificial fertilizer spreader (e.g., a sowing coulter); a mower; a pickup; or an agricultural attachment with a pickup (e.g., a baler or a loader wagon). In this way, the disclosed method may determine the working heights for a variety of types of agricultural attachments.

In one or some embodiments, the sensor holder may be mounted separate from the sensor on the different agricultural attachments, and the sensor may be reversibly mounted on the sensor holder. In other words, a first sensor holder may be attached, such as irreversibly attached, to a first agricultural attachment at a first mounting position, and a second sensor holder may be attached, such as irreversibly attached, to a second agricultural attachment at a second mounting position. The sensor may then be reversibly mounted at the first mounting position in the first agricultural attachment via the first sensor holder or may be reversibly mounted at the second mounting position in the second agricultural attachment via the second sensor holder. In this way, different sensor holds may be left on different ones of the agricultural attachments. Further, the at least one sensor holder may include an identification feature. In practice, the identification feature may be transmitted to the control assembly either by the at least one sensor holder transmitting the identification feature to the sensor assembly (e.g., the control assembly) or the sensor (e.g., when reversibly mounted in the at least one sensor holder) reads out the identification feature and transmits the identification feature to the control assembly (e.g., the sensor holder has a near field communication (NFC) tag with the identification feature; the sensor has an NFC reader, with the sensor using the NFC reader to read out the identification feature of the sensor holder and to transmits the identification feature to the control assembly).

In one or some embodiments, a user may select the mounting-position-specific calibration data set from an input unit, such as an input unit of an agricultural production machine that communicates with the control assembly. Or, the control assembly automatically selects the mounting-position-specific calibration data set based on the identification feature. In either way, the identification feature may be used to automatically select the mounting-position-specific calibration data set. This may allow the sensors to be easily mounted using the plug-and-play principal. In the best case, a user need only attach the sensor to the respective sensor holder and the sensor is then immediately ready to use.

In one or some embodiments, a plurality of working heights may be relevant on the agricultural attachment, or the relevant working height may be at a distance from the position of the sensor. As such, in one or some embodiments, the working height may be determined additionally from an agricultural attachment-specific calibration data set (which may comprise kinematics of the particular agricultural attachment), and/or a coupling data set of the equipment interface (e.g., the coupling data set may comprise machine parameters of a device interface between the agricultural production machine and the particular agricultural attachment; in particular, the coupling data set may comprise machine parameters of a three-point power lifter. As previously mentioned, the kinematics of the agricultural attachment and the equipment interface may have a general influence on the working height at different locations of the agricultural attachment. For example, these influences may be taken into account by an axis transformation.

In one or some embodiments, a calibration routine may be used in which a mounting-position-specific calibration data set may be generated. In particular, a reference height may be measured and saved therein. As such, the control assembly may perform a calibration routine in which the control assembly generates a mounting-position-specific calibration data set and may save mounting-position-specific calibration data set in the memory. In the calibration routine, the control assembly may save in the mounting-position-specific calibration data set any one, any combination, or all of: a reference height; an orientation of the sensor in the mounted state at the particular mounting position; or a location of the mounting position relative to the agricultural attachment. In particular, in the calibration routine, the control assembly may use the sensor to measure a distance of the sensor to the ground and saves the distance as a reference height (e.g., the predetermined spot being ground).

In one or some embodiments, the calibration data routine may be run using a natural language dialog. A user may therefore be easily guided through the calibration routine and need not refer to a manual in a time-consuming manner, for example. In this regard, the control assembly may guide the user through the calibration routine using an output unit in the natural language dialog. For example, the control assembly may specify a mounting position to the user, or the user may transmit the mounting position to the control assembly (e.g., by using voice input). Alternatively, or in addition, the control assembly may tell the user a setting of a working height of the agricultural attachment, or the user may transmit the setting of a working height (e.g., by voice input) to the control assembly. Still alternatively, or in addition, the control assembly may instruct the user to park one or both of the agricultural production machine or the agricultural attachment on level ground.

In one or some embodiments, one or both of the agricultural production machine or the agricultural attachment stand on flat ground during the calibration routine. For one or more mounting positions, the reference height may then be determined which, as such, represents a zero working height or refers to it. The working height may then be determined during operation by comparing the reference height with the measured data. In this process, the user mounts the sensor holder at a mounting position on an agricultural attachment and connects (such as mechanically connects) the sensor to the sensor holder. The control assembly performs a calibration routine in which the control assembly determines the reference height and generates a mounting-position-specific calibration data set, which may be saved in memory.

In one or some embodiments, in the simplest case, the absolute working height is a measured working height minus the reference height (e.g., the difference between a measured distance of the sensor to the ground and the reference height). Moreover, the control assembly may determine, such as continuously determine, the working height, output it to a user, or may set a machine parameter of one or both of the agricultural production machine or the agricultural attachment based on the working height. In this way, the control assembly may control the working height. In this regard, either the user or the control assembly may thereby control or regulate the actual working height.

In one or some embodiments, various distances of the sensor to ground are contemplated. For example, the sensor may be at a distance to the ground of at least 10 cm, and at most 1.5 m in the calibration routine or during operation while detecting a working height. Thus, the sensor in the calibration routine and/or during operation while detecting the working height may have a distance to the ground of at least 10 cm, of at least 20 cm, of at most 1.5 m, of at most 1.2 m, and the reference height may be at least 10 cm, at least 20 cm, and/or at most 1.5 m, or at most 1.2 m. Many sensor types may achieve good measuring results at these distances.

In one or some embodiments, a sensor assembly is disclosed for measuring an absolute working height of a plurality of agricultural attachments, in particular configured for use in the disclosed method. The sensor assembly includes a sensor and at least one sensor holder. The sensor may be reversibly mounted at a mounting position on different attachments using the at least one sensor holder. The sensor, in a mounted state, is configured to record measured data relating to a working height of the agricultural attachment and transmit the measured data to the control assembly. The control assembly is configured to receive the measured data and determine the working height of the particular attachment from a calibration data set specific to the mounting position. Thus, reference may be made to all statements regarding the disclosed method. With respect to the disclosed method, reference may also be made to the statements concerning the sensor assembly.

In one or some embodiments, the sensor may be mounted on the sensor holder in a form and/or force fit. Other fasteners are contemplated, including a quick-locking device, and/or using one or more screws, and/or magnetically, and/or is clipable in the sensor holder. In particular, fast and stable fastening may be beneficial.

In one or some embodiments, the sensor holder may have a battery and/or an electrical connection unit (e.g., a cable or an antenna) for connection to the control assembly and/or for transmitting energy from the agricultural production machine to the sensor. In one or some embodiments, the electrical connection unit has a bus connection, such an ISOBUS or CAN bus connection. In this way, power may be supplied to the sensor and/or communication connection may be achieved with the agricultural production machine. In one or some embodiments, the electrical connection unit comprises wiring into the agricultural production machine. If the sensor holder remains on the agricultural attachment (e.g., is irreversible or not easily removed), the cabling effort only occurs once.

In one or some embodiments, the sensor comprises a distance sensor, such as a contact-free distance sensor operating using a contact-free measuring principle. The distance sensor may function on the basis of electromagnetic waves, or acoustic waves, or mechanical sensing. In particular, the distance sensor may comprise a radar sensor, a lidar sensor, an optical sensor, or an ultrasonic sensor. Alternatively, the sensor may comprise a force sensor or position sensor, on a component touching the ground (17), such as a sensing bracket, a grinding skid or a support roller. As such, the indicated types of sensors may be suitable for use in the agricultural sector. In one or some embodiments, the sensor is correspondingly robust, for example against vibrations, and also functions reliably even when there is a large amount of dust, dirt, different temperatures, and in different environments.

As previously mentioned, more than one working height may be relevant or warranted when using an agricultural attachment. As such, in one or some embodiments, a plurality of sensors may be attached on an agricultural attachment in order to determine a longitudinal and/or transverse angle of the agricultural attachment. In particular, multiple sensor holders at several mounting positions may be irreversibly mounted onto the same agricultural attachment, with associated multiple sensors being reversibly mounted at the several mounting positions on a common attachment therein. The control assembly, receiving the measure data from the multiple sensors, is configured to determine the multiple workings heights of the agricultural attachment and/or the longitudinal and/or transverse angle of the attachment from a common calibration data set for the several mounting positions, and/or from individual calibration data sets for the several mounting positions. A plow, for example, has various points of engagement with the ground. If only one working height is optimized at a location of the plow, it may always lead to substantial deviations at other locations of the plow.

In one or some embodiments, the sensor assembly may include an antenna module that is connectable (such as communicatively connectible) to the agricultural production machine. For example, the antenna module may have a bus connection, such as an ISOBUS or CAN bus connection, for connecting to the control assembly, and an antenna for wirelessly connecting to the at least one sensor. In practice, the antenna module can be reversibly mounted on the agricultural production machine and can be connected via the bus connection to a bus of the agricultural production machine. In this way, various devices, such as the control assembly, may communicate with the at least one sensor using the antenna module, which may also allow cabling on the agricultural attachment to be omitted.

In one or some embodiments, an agricultural combination is disclosed, which includes the agricultural production machine and the agricultural attachment with the disclosed sensor assembly. In one or some embodiments, the sensor with the sensor holder is mounted on the agricultural attachment. Reference is further made to all statements regarding the disclosed method and the disclosed sensor assembly.

In one or some embodiments, the control assembly may be part of the agricultural production machine (e.g., may be installed entirely in the agricultural production machine). This may make it easier to transport and use the measured data as well as the determined working height.

In one or some embodiments, an agricultural fleet is disclosed, which may include at least one agricultural production machine, at least two agricultural attachments, and the disclosed sensor assembly. In one or some embodiments, the sensor assembly has at least two sensor holders of which one may be mounted on one of the agricultural attachments, or both may be mounted on different agricultural attachments, and at least one sensor holder is mounted on both attachments. Reference may be made to all statements regarding the disclosed method, the disclosed sensor assembly, and the disclosed agricultural combination.

In one or some embodiments, a sensor holder is disclosed. In one or some embodiments, the sensor holder is suitable to accommodate a sensor and be attached to an agricultural attachment, that the sensor holder has an electrical connecting unit, such as a cable or an antenna, for electrically connecting to a control assembly of an agricultural production machine and/or to transmit energy (e.g., power) from an agricultural production machine to the sensor and so that the identification feature may be communicated to the control assembly (e.g., the sensor holder may transmit the identification feature to the control assembly and/or the identification feature is suitable to be read out by the sensor and transmitted to the control assembly).

Reference may be made to all statements regarding the disclosed method, the disclosed sensor assembly, and the disclosed agricultural combination, and the disclosed agricultural fleet.

In one or some embodiments, a distance sensor is disclosed for use as a sensor in a disclosed sensor assembly. In one or some embodiments, the sensor may read out the identification feature of the sensor holder, and the identification feature may also transmit measured data including a distance in a bus-compatible format to the control assembly of the agricultural production machine.

Reference may be made to all statements regarding the disclosed method, the disclosed sensor assembly, and the disclosed agricultural combination, the disclosed agricultural fleet and the disclosed sensor holder.

In one or some embodiments, an antenna module for use in a disclosed sensor assembly is disclosed. Reference may be made to all statements regarding the disclosed method, the disclosed sensor assembly, the disclosed agricultural combination, the disclosed agricultural fleet, the disclosed sensor holder, and the disclosed distance sensor.

Referring to the figures, the disclosed solution may be applied to a wide range of agricultural production machines 1, such as self-propelled agricultural production machines 1. This includes prime movers, such as tractors, and harvesting machines, such as combines, forage harvesters, or the like. In the embodiment that is shown, the agricultural production machine 1 is a tractor.

The agricultural production machine 1 may be equipped via at least one equipment interface 2 with at least one agricultural attachment 3. The equipment interface 2 in this case is very generally a mechanical coupling between the agricultural production machine 1 and the agricultural attachment 3. In the shown embodiment, the equipment interface 2 is designed as a three point power lifter 4 that has two lower links 5 and one upper link 6 for coupling to the agricultural attachment 3. The equipment interface 2 may be designed as a front or rear power lifter. In principle, the equipment interface 2 may also be a ball hitch. Other versions of the equipment interface 2 are systems with a simple drawbar coupling, with hitch hooks, with a ball head coupling, or the like.

Figure 1:
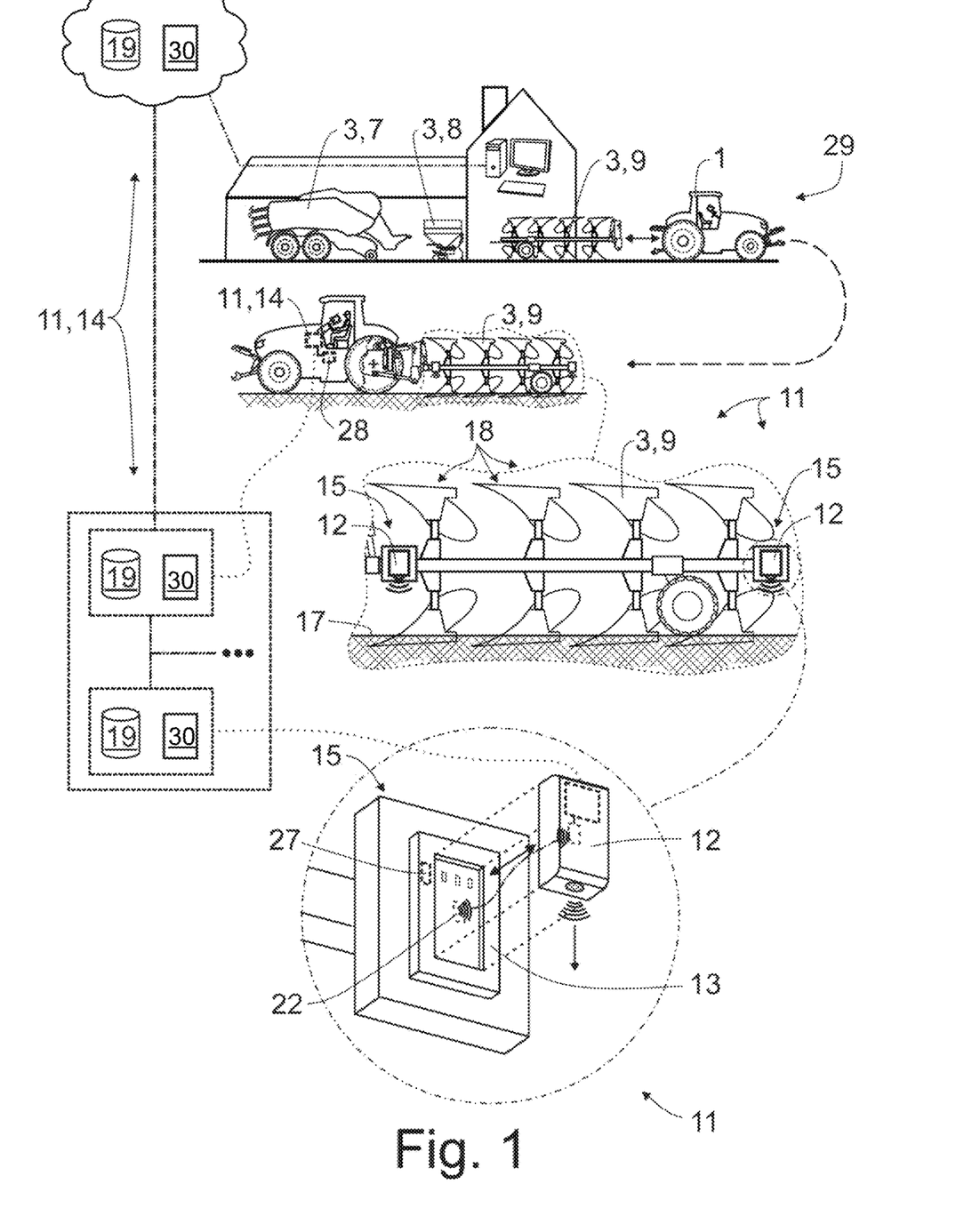
FIG. 1 illustrates an agricultural fleet with the disclosed sensor assembly while the disclosed method is being performed.

FIG. 1 shows several agricultural attachments 3 that may be used in the disclosed method, specifically a baler 7, an artificial fertilizer spreader 8, and a plow 9. These are shown in action in FIGS. 2A-D. The embodiment shown in the figures relates to a method for measuring an absolute working height 10 of a plurality of agricultural attachments 3 using a sensor assembly 11 with a sensor 12 having at least one sensor holder 13, and having a sensor assembly 11, wherein the sensor 12 is reversibly mounted at a mounting position 15 on different agricultural attachments 3 using the at least one sensor holder 13, wherein the sensor 12, in a mounted state, records measured data relating to a working height 10 of the agricultural attachment 3 and transmits it to the control assembly 14, and wherein the control assembly 14 determines the working height 10 of the particular agricultural attachment 3 from a calibration data set specific to the mounting position.

In one or some embodiments, the disclosed method therefore specifically relates to the measurement of working heights 10 of different agricultural attachments 3. The different agricultural attachments 3 may originate from different series, from different manufacturers, etc. In one or some embodiments, agricultural attachments 3 are different types such as plows 9, cultivators, harrowers, artificial fertilizer spreaders 8, mowers, 16 etc.

The sensor assembly 11 as such may be integrated independently at least partially in the agricultural production machine 1. In particular, the control assembly 14 of the sensor assembly 11 may for example be a control assembly 14 of the agricultural production machine 1. Likewise, this may, however, also comprise (or consist of) distributed computing units. It may, for example, have a control unit of the agricultural production machine 1 and a cloud control unit.

The various assemblies, such as sensor assembly 11 and/or control assembly 14 (or any other or any other functionality described herein using computing logic), may comprise any type of computing functionality, such as at least one processor 30 (which may comprise a microprocessor, controller, PLA, or the like) and at least one memory 19. This is illustrated, for example, in FIG. 1, with the computing functionality equally applied to each of FIG. 2A-D or 3. The memory 19 may comprise any type of storage device (e.g., any type of memory). Though the processor 30 and memory 19 are depicted as separate elements, they may be part of a single machine, which includes a microprocessor (or other type of controller) and a memory. Alternatively, processor 30 may rely on memory 31 for all of its memory needs.

The processor 30 and memory 19 are merely one example of a controller assembly configuration. Other types of controller assembly configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Using the sensor 12, an absolute working height 10 is measured. In one or some embodiments, the term "absolute" is not necessarily to be understood as a precise measurement, but generally as a measurement relative to the ground 17. It is basically contemplated for the measurement to be relative to a component whose height relative to the ground 17 is known. In one or some embodiments, however, the absolute working height 10 may be measured directly relative to the ground 17. It may also be a working depth if the agricultural attachment 3 enters into the ground 17. In principle, the working height 10 relates to a component of the agricultural attachment 3 that serves to work the field. This fieldwork may however also be sowing or the like. For example, the absolute working height 10 may relate to the distance of a plowshare 18 to the ground 17, in this case generally the working depth, the distance of a discharge of an artificial fertilizer spreader 8 or sprayer to the ground 17, or the like. In one embodiment, the focus is on the soil cultivation equipment, which is why the working height 10 may be a working depth.

In one or some embodiments, the measured data may be transmitted by the sensor 12 to the control assembly 14 in any manner whatsoever. In particular, the sensor 12 need not actively send the data; rather, the measured data may also be read out. In one or some embodiments, the transmission is regular and/or continuous.

In one or some embodiments, the sensor 12 is mounted using the sensor holder 13 at the mounting position 15 such that the mounting is nondestructively reversible. In one or some embodiments, this mounting of the sensor need not be done in the context of producing the agricultural attachment 3; instead, it is possible on site in the field to mount the sensor using simple tools, or entirely without tools. In one or some embodiments, the at least one sensor holder 13 remains permanently on an agricultural attachment 3. In one or some embodiments, multiple sensor holders 13 are mounted on a single agricultural attachment 3. For example, at least five sensor holders 13 may be permanently mounted on one or more agricultural attachments 3.

The calibration data set, as explained below, may in principle be saved in any desired memory 19, created new and stored, or provided to the control assembly 14 in a different way (e.g., created externally to the control assembly 14 and then stored therein).

An advantageous use of the disclosed method relates to the measurement of the working height 10 of an agricultural attachment 3 that does not have its own electronics. As seen below, the sensor assembly 11 may therefore be independent from the agricultural attachment 3. Alternatively, in one or some embodiments, the sensor 12 does not communicate with the agricultural attachment 3. Still alternatively, the sensor 12 is integrated in electronics of the agricultural attachment 3 or communicates therewith. Also in the case of agricultural attachments 3 with electronics, it may however be provided that the sensor 12 does not communicate directly with the agricultural attachment 3. In one or some embodiments, the sensor assembly 11 may be used with agricultural attachments 3 with and without electronics. Alternatively, it may even be provided that the determination of the working height 10, apart from the calibration itself, is completely independent of the agricultural attachment 3.

Moreover, in one or some embodiments, the mounting-position-specific calibration data sets comprise any one, any combination, or all of: a reference height 20; an orientation of the sensor 12 in the mounted state at the particular mounting position 15; or a location of the mounting position 15 relative to the agricultural attachment 3.

The reference height 20 may originate from a calibration routine described below, and may relate to a height of the mounting position 15 of the sensor 12 in a reference state, such as with a known working height 10. The orientation of the sensor 12 may, for example, be a tilt of the sensor 12. This may take into account that the sensor 12 might not measure the shortest distance to the ground 17. The location of the mounting position 15 relative to the agricultural attachment 3 may be selected from a group of given mounting positions 15 or may be determined in another way. FIG. 1, for example, shows two mounting positions 15 on a plow 9. FIGS. 2A-D also show several possible mounting positions 15 on different agricultural attachments 3. As will be explained, it is also contemplated to measure several working heights 10 per agricultural attachment 3 and thereby record, for example, an angle of the agricultural attachment 3. To accomplish this, it may be necessary to locate the mounting position 15 of one or more sensors 12.

In one or some embodiments, the mounting-position-specific calibration data sets are saved in a memory 19 of the control assembly 14. In this case, this memory 19 is a local memory 19 of the agricultural production machine 1. In principle, a cloud memory 19 or the like is also contemplated. Calibration data sets relating to mounting positions 15 of at least two, such as at least three, different types of agricultural attachments 3 may be saved in the memory 19. The different types of agricultural attachments 3 may comprise at least one type of soil cultivation device or at least two types of soil cultivation devices. The types of soil cultivation devices may comprise any one, any combination, or all of: a plow 9; a cultivator; or a harrow. Moreover, the different types of agricultural attachments 3 may comprise any one, any combination, or all of: a seeder; an artificial fertilizer spreader 8 (e.g., a sowing coulter and/or a mower 16); a pickup 21; or an agricultural attachment 3 with a pickup 21 (e.g., a baler 7 or a loader wagon). In one or some embodiments, at least some of the agricultural attachments 3 are independent vehicles with at least one independent axle and independent wheels. In addition or alternatively, the agricultural attachment 3 may be designed without an axle or wheels and be borne by the tractor or another agricultural attachment 3. In this regard, reference is made to the equipment interfaces 2 previously mentioned.

As shown in the lower region of FIG. 1, the sensor holder 13 may be mounted separately from the sensor 12 on the different agricultural attachments 3. The sensor 12 may then be reversibly mountable on the sensor holder 13. In one or some embodiments, the sensor holder 13 is a relatively inexpensive mass-produced component, while the sensor 12 itself is relatively expensive. The disclosed method allows the expensive sensor 12 to be reused.

For reasons of convenience, however, it may be provided that the sensor holder 13 remains on the agricultural attachment 3. On the one hand, this has clear advantages in the context of the calibration routine yet be explained, but on the other hand it also enables the sensor holder 13 to be mounted in a stable and more permanent manner, while the mounting of the sensor 12 on the sensor holder 13 itself may be relatively simple. This also allows for the same mounting position 15 to be reused when the sensor 12 is attached again. Accordingly, the mounting-position-specific calibration data set may also be assigned to the sensor holder 13 at the corresponding mounting position 15. In order to depict this assignment, the sensor holder 13 has an identification feature 22.

In one or some embodiments, the identification feature 22 may be transmitted from the sensor holder 13 to the control assembly 14. However, in some embodiments, this sensor holder 13 does not have its own electronics. As such, it may therefore also be provided that the sensor 12, in particular in the mounted state, reads out the identification feature 22 and transmits the identification feature 22 to the control assembly 14. In one or some embodiments, the sensor holder 13 has an NFC tag. In one or some embodiments, the sensor 12 may then have an NFC reader, through which the sensor 12 reads out the identification feature 22 of the sensor holder 13 and transmits the identification feature 22 to the control assembly 14. Alternatively, in one or some embodiments, the user 23 may enter the identification feature 22 via an input device, such as a smartphone, or read it out with the smartphone. The input device may then transmit the identification feature 22 to the control assembly 14. Alternatively, the input device may be part of the control assembly 14. In one or some embodiments, the identification feature 22 may be a QR code that the user 23 reads out, for example in a dedicated app. All these possibilities allow the sensor 12 to be quickly mounted, which leads directly to the usability of the sensor 12 for determining the working height 10. Instead of a smartphone, a tablet, a laptop, a smartwatch or the like may also be used.

Additionally or alternatively, a user 23 may select the mounting-position-specific calibration data set from an input unit, such as an input unit of an agricultural production machine 1 that communicates with the control assembly 14. Alternatively, or in addition, the control assembly 14 automatically selects the mounting-position-specific calibration data set based on the identification feature 22 (e.g., the control assembly receives the identification feature, accesses a data construct, such as a table, that correlates a respective identification feature 22 to a respective mounting-position-specific calibration data set, and then selects the respective mounting-position-specific calibration data set based on the table).

Figure 2A:
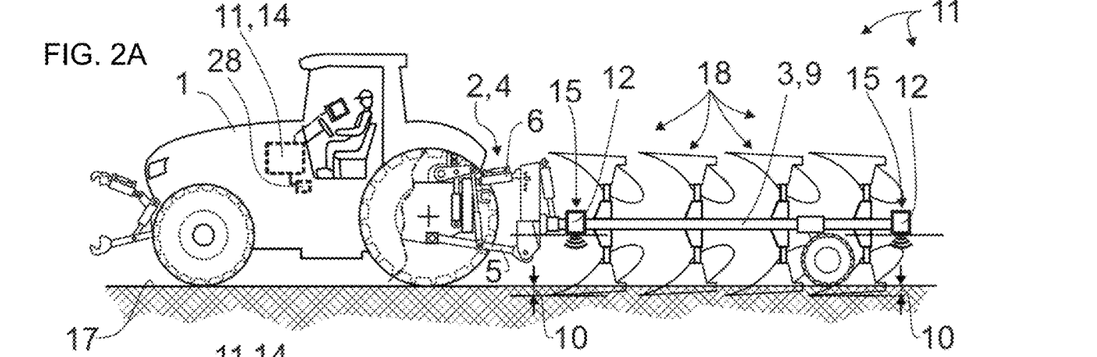
FIGS. 2A-D illustrate different attachments with which the disclosed method may be performed.
Figure 2B:
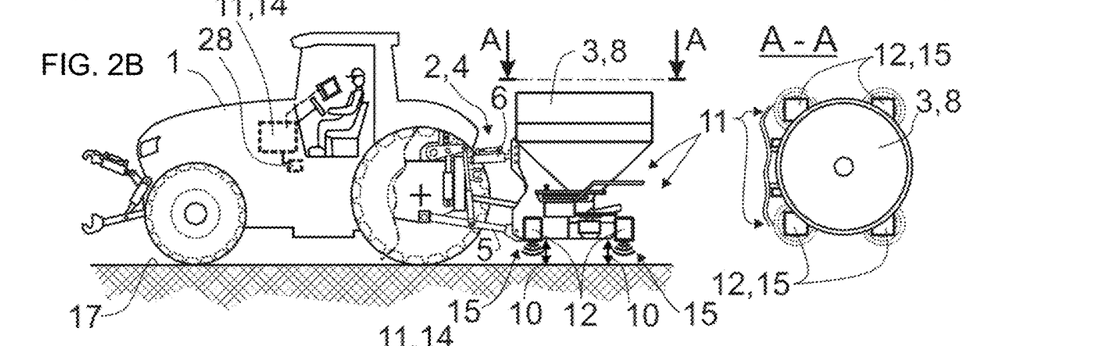
Figure 2C:
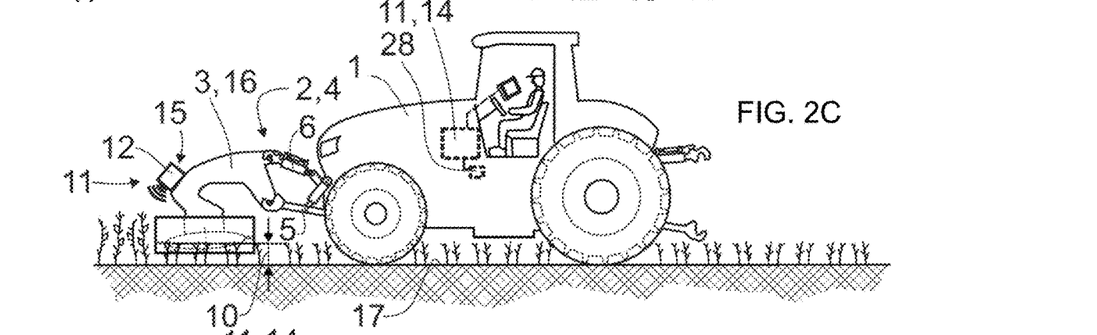
Figure 2D:
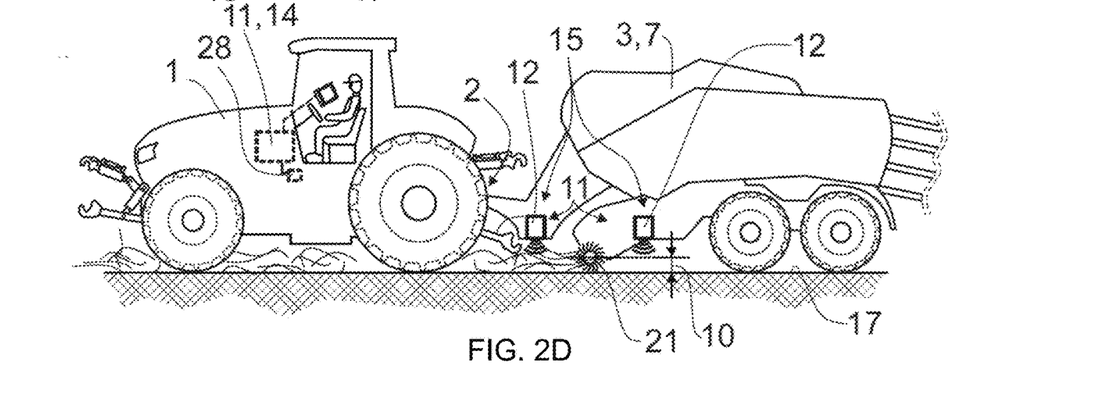

As previously noted, various agricultural attachments 3 have different relevant working heights 10. For example, a plow 9 with several plowshares 18 is shown in FIG. 2A. Each of these plowshares 18 has its own working height 10. If the plow 9 is, for example, strongly angled along its longitudinal axis, optimization of only one working height 10 would not yield optimal results. One solution for this is to use several sensors 12 as shown in FIGS. 2A-D. This may thus increase the cost due to use of multiple sensors 12.

Thus, in one or some embodiments, it may therefore be provided that the control assembly 14 additionally determines the working height 10 from an agricultural attachment-specific calibration data set, and the agricultural attachment-specific calibration data set comprises kinematics of the particular agricultural attachment 3. Alternatively, or in addition, the control assembly 14 additionally determines the working height 10 from a coupling data set, with the coupling data set comprises machine parameters of an equipment interface 2 between the agricultural production machine 1 and the particular agricultural attachment 3. For example, in the case of the particular coupling comprising a three-point power lifter 4, the coupling data set comprises machine parameters of a three-point power lifter 4 with the coupling data set tailored to the three-point power lifter 4 correlated in a data construct with an indication of the three-point power lifter 4. In practice, the control assembly 14 may determine the particular coupling, such as the three-point power lifter 4, access the data construct in order to then access the coupling data set tailored to the three-point power lifter 4.

Using the agricultural attachment-specific calibration data set and coupling data set, the number of necessary sensors 12 to determine several working heights may be reduced, for example, via an axis transformation using the kinematics of the agricultural attachment 3 or via known machine parameters of the equipment interface 2. The determination of a single working height may also be verified or performed more precisely in this way, if necessary. In one or some embodiments, however, at least one working height 10 may be determined without taking into account the machine parameters of the equipment device interface 2.

In principle, the agricultural attachment-specific calibration data set may be contained in the mounting-position-specific calibration data set, or vice versa. The coupling data set may be attachment-specific, but does not have to be. It may comprise, for example, lengths of hydraulic cylinders of the equipment interface 2. Generally speaking, machine parameters are to be understood as any and all of the settings, associated sensor measured values, and the like. In this case, the machine parameters relate at least partially to machine parameters that have a direct influence on the working height 10 that is to be detected.

In one or some embodiments, the control assembly 14 performs a calibration routine in which the control assembly 14 generates a mounting-position-specific calibration data set and may thereafter save mounting-position-specific calibration data set in the memory 19 (e.g., saved in a data construct correlating the specific mounting position with the specific mounting-position-specific calibration data set). This calibration routine is explained in greater detail below. Reference in this regard is made in particular to FIG. 3. In one or some embodiments, in the calibration routine, the control assembly 14 saves any one, any combination, or all of: a reference height 20; an orientation of the sensor 12 in the mounted state at the particular mounting position 15; or a location of the mounting position 15 relative to the agricultural attachment 3 in the mounting-position-specific calibration data set. A maximum and/or minimum working height 10 may be saved in the calibration data set.

In one or some embodiments, the calibration routine is performed on level ground. In so doing, the control assembly 14 may inform the user 23 that he/she should park the agricultural production machine 1 and/or the agricultural attachment 3 on level ground, and/or assume that this has been done. Moreover, in one or some embodiments, the agricultural attachment 3 assumes a reference height 20. In the case of a plow 9, the reference height 20 may, for example, be established at a working height 10 of zero when the plowshares 18 are placed on the ground 17. However, in a seeder, for example, it may also happen that the lowest adjustable height and a usual working height 10 are too far apart to calibrate the sensor 12 in this manner and still remain within the specification of the sensor 12 during use. Therefore, it may equally be provided that the user 23 may enter or otherwise determine the reference height 20.

In one or some embodiments, the control assembly 14 uses the sensor 12 in the calibration routine to measure a distance of the sensor 12 from the ground 17 and stores this as the reference height 20. Of note is that the mounting position 15, which may be specified by the control assembly 14, does not have to be precisely maintained by the user 23, especially in the height direction, since it is removed from the reference height 20 when the working height 10 is determined. In other directions as well, great precision is usually not required due to the tolerances prevailing in agriculture.

If the agricultural attachment 3 has its own setting options for the working height 10, it may be provided that the settings present during the calibration routine are also saved in the mounting-position-specific calibration data record, and changes to these settings may lead to the user 23 being warned, or if necessary, be taken into account using a model of the agricultural attachment 3 when determining the working height 10.

In one or some embodiments, the control assembly 14 guides a user 23 through the calibration routine using an output unit in a natural language dialog. In one or some embodiments, the control assembly 14 specifies a mounting position 15 to the user 23, or the user 23 transmits the mounting position 15 to the control assembly 14, such as by voice input, and/or the control assembly 14 tells the user 23 a setting of a working height 10 of the agricultural attachment 3, or the user 23 transmits the setting of a working height 10, such as by voice input, to the control assembly 14, and/or the control assembly 14 tells the user 23 to park the agricultural production machine 1 and/or the agricultural attachment 3 on level ground.

In addition or alternatively, a natural language dialog may be provided to guide the user 23 through mounting the sensor holder 13 and/or selecting the mounting position 15.

The dialog may be performed using a voice output device 24 and/or voice input device 25 of the agricultural production machine 1 and/or a smartphone. However, it is equally possible to use a terminal 26 of the agricultural production machine 1 and/or the smartphone without voice input and/or output.

Figure 3:
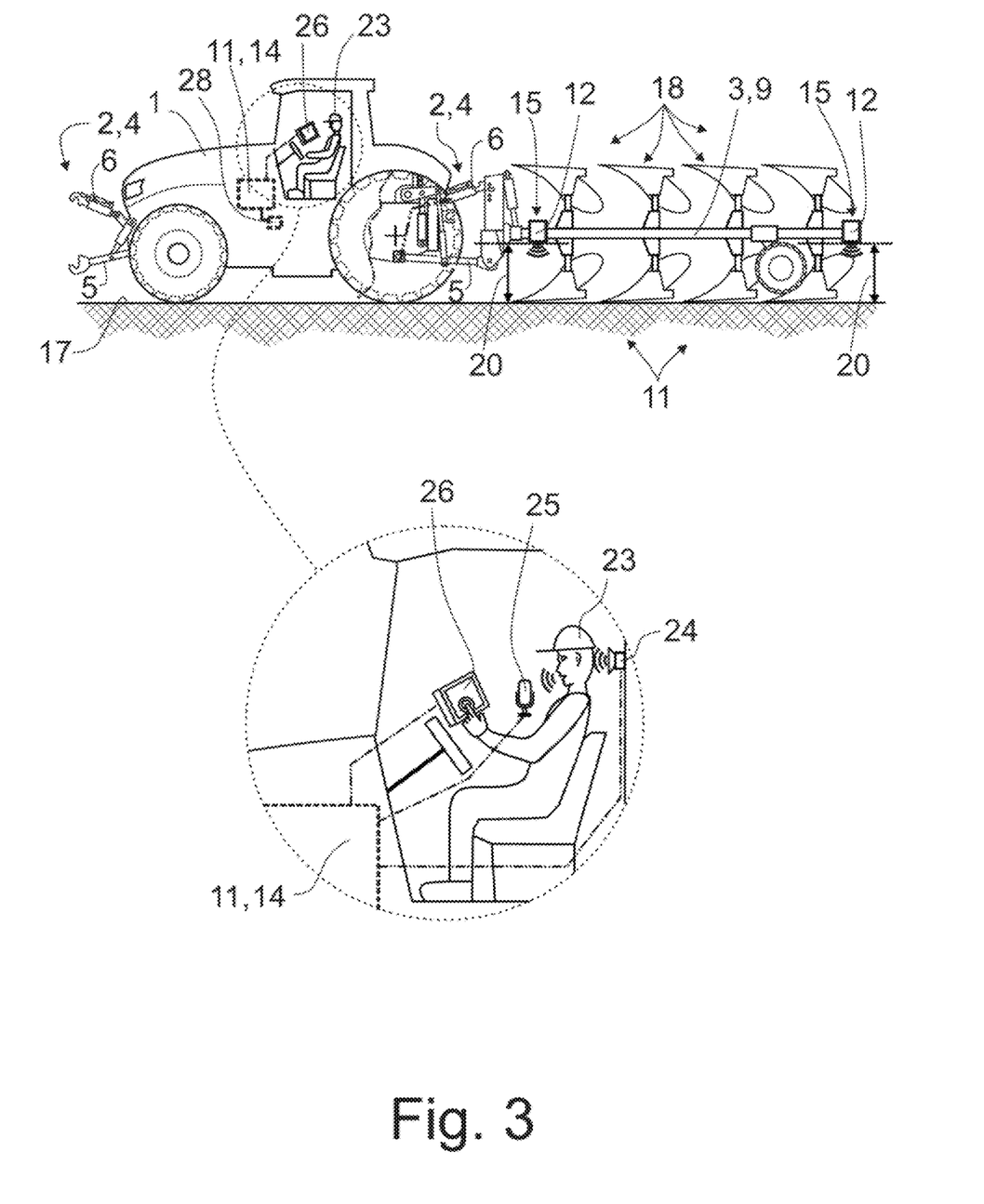
FIG. 3 illustrates a moment while the calibration routine is being performed.

In one or some embodiments, the agricultural production machine 1 and/or the agricultural attachment 3 is on level ground during the calibration routine, the user 23 mounts the sensor holder 13 at a mounting position 15 on an agricultural attachment 3 and connects the sensor 12 to the sensor holder 13, and the control assembly 14 performs a calibration routine in which the control assembly 14 determines a reference height 20 and generates a mounting-position-specific calibration data set and thereafter may save it in the memory 19. FIG. 3 shows this process, wherein the sensor 12 has already been mounted in the sensor holder 13.

As previously explained, the control assembly 14 may determine the working height 10 as a difference between a measured distance of the sensor 12 to the ground 17 and the reference height 20, and/or the control assembly 14 may determine (such as continuously determine) the working height 10, and/or the control assembly 14 outputs the working height 10 to an output unit for outputting to the user 23, and/or the control assembly 14 may adjust a machine parameter of one or both of the agricultural production machine 1 or the agricultural attachment 3 based on the working height 10, and the control assembly 14 may control the working height 10.

The output unit may be the terminal 26 or the smartphone, and/or may have the voice output device 24.

The ability to control and/or regulate this working height 10 by the determined working height 10 may be beneficial. Previously, such regulations were very complicated since they normally had to take into account numerous machine parameters of the equipment interface 2, the agricultural attachment 3, and the agricultural production machine 1. Given the possibility of incorporating the working height 10 directly as feedback in regulation, this may be intentionally influenced by fewer manipulated variables, in particular of the equipment interface 2. An anticipated influence of machine parameters of the equipment interface 2 may, for example, be saved in a characteristic diagram model.

Moreover, in one or some embodiments, the sensor 12 in the calibration routine and/or during operation while detecting the working height 10 may have a distance to the ground 17 of at least 10 cm, such as at least 20 cm, and/or at most 1.5 m, such as at most 1.2 m, and such as the reference height 20 is at least 10 cm, such as at least 20 cm, and/or at most 1.5 m, such as at most 1.2 m.

In one or some embodiments, to configure a sensor assembly 11 for measuring an absolute working height 10 of a plurality of agricultural attachments 3, such as configured for use in the disclosed method, with a sensor 12, with at least one sensor holder 13, and with a sensor assembly 11, wherein the sensor 12 is reversibly mounted at a mounting position 15 on different agricultural attachments 3 using the at least one sensor holder 13, wherein the sensor 12, in a mounted state, is configured to record (e.g., sense or generate) measured data relating to a working height 10 of the agricultural attachment 3 and transmit the measured data to the control assembly 14, wherein the control assembly 14 is configured to determine the working height 10 of the particular agricultural attachment 3 from the measured data and a calibration data set specific to the mounting position.

Reference is made to all statements regarding the disclosed method. The following statements may also relate to disclosed methods.

In one or some embodiments, the sensor 12 is mountable on the sensor holder 13 in a form fit and/or force fit, such as the sensor 12 is mountable on the sensor holder 13 using a quick-locking device, and/or by means of one or more screws, and/or magnetically (e.g., a magnetic connection), and/or is clipable in the sensor holder 13. In one or some embodiments, the sensor 12 may be mounted on the sensor holder 13 using commercially available tools or without any tools at all.

In one or some embodiments, the sensor holder 13 has a battery and/or an electrical connection unit 27, such as a cable or an antenna, for connection to the control assembly 14, and/or for transmitting energy from an agricultural production machine 1 to the sensor 12. In one or some embodiments, the electrical connection unit 27 has a bus connection, such as an ISOBUS or CAN bus connection, through which one or both of communication between the control assembly 14 and the sensor 12 may be performed and/or through which power to the sensor 12 may be sent.

Using a sensor holder 13 with such a design, the sensor 12 may be supplied with energy. At the same time or alternatively, the sensor holder 13 may be used to transmit the data from the sensor 12 to the control assembly 14. This is particularly interesting if the control assembly 14 is part of the agricultural production machine 1, or the connection to the control assembly 14 runs via the agricultural production machine 1. If the sensor holder 13 has a cable that may be connected to a bus of the agricultural production machine 1 if necessary, and if the sensor holder 13 remains on the agricultural attachment 3 (e.g., the sensor holder 13 is permanently attached to the agricultural attachment 3), the wiring only has to be done once. This is a logical extension of the "plug and play" concept of the sensor assembly 11. In one or some embodiments, the battery may comprise a rechargeable battery. Likewise, in one or some embodiments, the sensor 12 may also have its own battery or its own rechargeable battery. In particular, it is also contemplated for the sensor holder 13 to have no electronics at all, in which case the NFC tag is not considered as electronics (e.g., not considered active electronics). Provided that the agricultural attachment 3 has its own power supply, which may be powered by the agricultural production machine 1, the sensor 12 may also be connected thereto, in particular via the sensor holder 13.

In one or some embodiments, the sensor 12 comprises a contact-free sensor, such as an especially contact-free distance sensor. The distance sensor may function on the basis of electromagnetic waves, or acoustic waves, or mechanical sensing.

The distance sensor may be any one of a radar sensor, a lidar sensor, an optical sensor, or an ultrasonic sensor.

Alternatively, the sensor 12 may be a force sensor or position sensor on a component touching the ground 17, such as a sensing bracket, a grinding skid or a support roller.

In one or some embodiments, the sensor assembly 11 has at least two sensors 12 with different functional principles that are each reversibly mounted on the sensor holder 13. Since the sensors 12 may be used modularly, there may also be a plurality of different sensors 12 that are correspondingly selected depending on the agricultural attachment 3 (e.g., the plurality of different sensors 12 are mounted on the same agricultural attachment 3) and/or the agricultural activity that is to be performed. These may then be each compatible with the same sensor holder 13.

Moreover, in one or some embodiments, the sensor assembly 11 includes a plurality of sensor holders 13 and associated sensors 12 that may be reversibly mounted therein at several mounting positions 15 on a common agricultural attachment 3, and the control assembly 14 is configured to determine several working heights 10 and/or a longitudinal and/or transverse angle of the agricultural attachment 3 from a common calibration data set for the several mounting positions 15, and/or from individual calibration data sets for the several mounting positions 15.

This therefore makes it possible to control or regulate different working heights 10 of the agricultural attachment 3 jointly. The working heights 10 may be calculated using known mathematical procedures. An axis transformation using the kinematics of the agricultural attachment 3 as known from robotics may be used.

Moreover, in one or some embodiments, the sensor assembly 11 has an antenna module 28, with the antenna module 28 having a bus connection, such as an ISOBUS or CAN bus connection, for connecting to the control assembly 14, and an antenna for wirelessly connecting to the at least one sensor 12. In one or some embodiments, the antenna module 28 may be reversibly mounted on the agricultural production machine 1 and may be connected via the bus connection to a bus of the agricultural production machine 1.

The ability of such an antenna module 28 to have a bus connection may be beneficial since it may also be used in a modular fashion with a plurality of agricultural production machines 1, and the agricultural attachment 3 therefore does not have to be wired. The antenna module 28 may communicate wirelessly directly with the sensor 12 and/or with the sensor holders 13 resident (either temporarily or permanently) on the agricultural attachment 3. It is therefore contemplated, for example, for a user 23 to only have to plug in the antenna module 28 and one or more sensors 12 into corresponding sockets and therefore immediately have a working height sensor system. In one or some embodiments, the sockets for the sensors 12 are the sensor holders 13; an antenna module holder may be provided for the antenna module 28.

Moreover, in one or some embodiments, an agricultural combination with an agricultural production machine 1 and an agricultural attachment 3 is disclosed with a disclosed sensor assembly 11. Reference is made to all statements regarding the disclosed method and the disclosed sensor assembly 11.

In one or some embodiments, the sensor 12 with the sensor holder 13 is mounted on the agricultural attachment 3.

Moreover, in one or some embodiments, at least a part of the sensor assembly 11, such as the control assembly 14, is installed, such as entirely installed, within the agricultural production machine 1.

Moreover, in one or some embodiments, an agricultural fleet 29 with at least one agricultural production machine 1 and at least two agricultural attachments 3 and at least one disclosed sensor assembly 11 is disclosed. Reference can be made to all statements regarding the disclosed method, the disclosed sensor assembly 11, and the disclosed agricultural combination.

In one or some embodiments, the sensor assembly 11 has at least two sensor holders 13. In one embodiment, both of the at least two sensor holders 13 are mounted on a same agricultural attachment 3. Alternatively, one of the at least two sensor holders 13 is mounted on a first agricultural attachment 3 and another of the at least two sensor holders 13 is mounted on a second agricultural attachment 3. Still alternatively, at least two sensor holders are mounted on the first agricultural attachment 3 and at least two sensor holders are mounted on the second agricultural attachment 3. Thus, for at least two sensor holders 13, one of which may be mounted on one of the agricultural attachments 3, or both may be mounted on several agricultural attachments 3, and at least one sensor holder 13 is mounted on both agricultural attachments 3. As previously explained, this sensor holder 13 may remain at least temporarily, such as over months or years, on the agricultural attachment 3.

Moreover, in one or some embodiments, a sensor holder 13 is disclosed, which may be used as a part of a disclosed sensor assembly 11. Reference may be made to all statements regarding the disclosed method, the disclosed sensor assembly 11, and the disclosed agricultural combination, and the disclosed agricultural fleet.

In one or some embodiments, the sensor holder 13 is suitable to accommodate a sensor 12 and be attached to an agricultural attachment 3, that the sensor holder 13 has an electrical connecting unit 27, such as a cable or an antenna, for connecting to a control assembly 14 of an agricultural production machine 1 and/or to transmit energy from an agricultural production machine 1 to the sensor 12 and an identification feature 22, that the sensor holder 13 may transmit the identification feature 22 to the control assembly 14, and/or the identification feature 22 is suitable to be read out by the sensor 12.

Moreover, in one or some embodiments, a distance sensor for use as a sensor 12 in a disclosed sensor assembly 11 is disclosed. Reference can be made to all statements regarding the disclosed method, the disclosed sensor assembly 11, and the disclosed agricultural combination, the disclosed agricultural fleet and the disclosed sensor holder 13.

In one or some embodiments, the sensor 12 may read out the identification feature 22 of the sensor holder 13, and/or the sensor 12 may also transmit measured data including a distance in a bus-compatible format to the control assembly 14 of the agricultural production machine 1.

Moreover, in one or some embodiments, the antenna module 28 is disclosed for use in the disclosed sensor assembly. Reference is made to all statements regarding the disclosed method, the disclosed sensor assembly, the disclosed agricultural combination, the disclosed agricultural fleet, the disclosed sensor holder, and the disclosed distance sensor.

In one or some embodiments of the sensor assembly, the electrical connection unit may comprise a cable or an antenna.

In one or some embodiments of the sensor assembly, the sensor may comprises one of: a contact-free distance sensor, wherein the distance sensor functions on the basis of at least one of: electromagnetic waves; acoustic waves; or mechanical sensing, and wherein the distance sensor is at least one of: a radar sensor, a lidar sensor, an optical sensor, or an ultrasonic sensor; or at least one of: a force sensor or position sensor on a component touching ground, that comprises at least one of a sensing bracket, a grinding skid or a support roller.

In one or some embodiments of the sensor assembly, the sensor assembly includes a plurality of sensor holders and associated sensors that are configured of reversible mounting at a plurality of mounting positions on a common attachment; and wherein the control assembly is configured to determine, from one or both of a common calibration data set for the plurality of mounting positions or from individual calibration data sets for the plurality of mounting positions, one or both of: a plurality of working heights or one or both of a longitudinal or a transverse angle of the agricultural attachment.

In one or some embodiments of the sensor assembly, the sensor assembly further comprises: an antenna module, the antenna module having a bus connection for connecting to the control assembly; and an antenna for wirelessly communicating with to the sensor; wherein the antenna module is configured for reversible mechanical mounting on an agricultural production machine and configured for communication connection via the bus connection to a bus of the agricultural production machine.

In one or some embodiments, an agricultural combination is disclosed. The agricultural combination comprises: an agricultural production machine; an agricultural attachment; and a sensor assembly. The sensor assembly comprises: a control assembly; a sensor; and at least one sensor holder configured for mounting at a respective mounting position on of the agricultural attachment, the sensor, using the at least one sensor holder, configured for reversibly mounting at the respective mounting position on the agricultural attachment, wherein the sensor, in a mounted state, is configured to record measured data relating to a working height of the agricultural attachment and transmit at least a part of the measured data to the control assembly; wherein the control assembly is configured to determine the working height of the agricultural attachment from a calibration data set specific to the respective mounting position.

In one or some embodiments of the agricultural combination, the control assembly is installed entirely in the agricultural production machine.

In one or some embodiments, an agricultural fleet is disclosed. The agricultural fleet comprises: at least one agricultural production machine; at least two agricultural attachments; and at least one sensor assembly. The at least one sensor assembly comprises: a control assembly; a sensor; and at least two sensor holders configured for mounting at respective mounting positions on the at least two agricultural attachments, the sensor, using one of the at least two sensor holders, configured for reversibly mounting at the respective mounting position on a respective one of the at least two agricultural attachments, wherein the sensor, in a mounted state, is configured to record measured data relating to a working height of the respective one of the at least two agricultural attachments and transmit at least a part of the measured data to the control assembly; wherein the control assembly is configured to determine the working height of the respective one of the at least two agricultural attachments from a calibration data set specific to the respective mounting position.

In one or some embodiments, a sensor holder is disclosed. The sensor holder is configured for use as part of a sensor assembly, with the sensor holder comprising: a mechanical connector configured to: (i) reversibly mechanically connect with a sensor; and (ii) be irreversibly attached to an agricultural attachment; wherein the sensor holder includes at least one of a cable or an antenna to perform one or both of: communicatively connecting to a control assembly of an agricultural production machine; or transmitting energy from the agricultural production machine to the sensor mechanically connected to the sensor holder; wherein the sensor holder includes an identification feature configured to identify the sensor holder; and wherein with regard to the identification feature, one or both of the following: the sensor holder is configured to transmit the identification feature to the control assembly; or the identification feature is configured to be read out by the sensor for transmission to the control assembly.

In one or some embodiments, a distance sensor is disclosed. The distance sensor is configured for use as a sensor in a sensor assembly and comprises: means for reading an identification feature of sensor holder in which the distance sensor is reversibly connected; means for sensing measured data indicative of a working height of an agricultural attachment, the measured data including a distance to a predetermined spot; and means for transmitting the measured data including the distance in a bus-compatible format to a control assembly of an agricultural production machine.

In one or some embodiments of the distance sensor, the predetermined spot comprises ground.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Agricultural production machine
2 Equipment interface
3 Agricultural attachment
4 Three-point power lifter
5 Lower link
6 Upper link
7 Baler 8 Artificial fertilizer spreader
9 Plow
10 Working height
11 Sensor assembly
12 Sensor
13 Sensor holder
14 Control assembly
15 Mounting position
16 Mower
17 Floor
18 Plowshare
19 Memory
20 Reference height
21 Pick-up
22 Identification feature
23 User
24 Voice output device
25 Voice input device
26 Terminal
27 Electrical connecting unit
28 Antenna module
29 Agricultural fleet
30 Processor

The invention claimed is:

1. A method for measuring a working height of a plurality of different agricultural attachments, the method comprising:
in a sensor assembly having respective sensor holders and having a control assembly, wherein the respective sensor holders are configured to have reversibly mounted therein or thereon a sensor in respective mounting positions on respective agricultural attachments:
recording, using the sensor in a respective mounted state on the respective sensor holder, measured data relating to a working height of the respective agricultural attachment;
transmitting, to the control assembly, at least a part of the measured data from the sensor in the respective mounted state on the respective sensor holder;
automatically accessing, by the control assembly, a respective mounting-position-specific calibration data set, the respective mounting-position-specific calibration data set comprising calibration data specific to the respective mounting position on the respective sensor holder for the respective agricultural attachment;
automatically determining, by the control assembly, the working height of the respective agricultural attachment from the respective mounting-position-specific calibration data set specific to the respective mounting position on the respective sensor holder for the respective agricultural attachment; and
automatically controlling, by the control assembly responsive to determining the working height of the respective agricultural attachment, the respective agricultural attachment.

2. The method of claim 1, wherein the respective mounting-position-specific calibration data set comprise one or more of: a reference height in reference to a height of the respective mounting position; an orientation of the sensor in the respective mounted state at the respective mounting position; or a location of the respective mounting position relative to the respective agricultural attachment of the plurality of different agricultural attachments.

3. The method of claim 2, wherein at least two respective mounting-position-specific calibration data sets correlated to the respective mounting positions for different types of agricultural attachments are saved in a memory.

4. The method of claim 3, wherein the different types of agricultural attachments comprise at least two types of soil cultivation devices, the two types of soil cultivation devices comprising one or more of: a plow; a cultivator; or a harrow.

5. The method of claim 3, wherein the different types of agricultural attachments comprise one or more of: a seeder; artificial fertilizer spreader; a mower; a pickup; or an agricultural attachment with the pickup.

6. The method of claim 2, wherein the respective mounting-position-specific calibration data set comprise each of: a reference height in reference to a height of the respective mounting position; an orientation of the sensor in the respective mounted state at the respective mounting position; or a location of the respective mounting position relative to the respective agricultural attachment of the plurality of different agricultural attachments.

7. The method of claim 1, wherein the respective sensor holder is mounted separate from the sensor on different respective agricultural attachments; and
wherein the sensor is reversibly mounted in the respective sensor holder;
wherein the respective sensor holder has an identification feature;
wherein the control assembly receives the identification feature either transmitted by the respective sensor holder or read by the sensor.

8. The method of claim 7, wherein the identification feature comprises a near field communication (NFC) tag;
wherein the sensor includes an NFC reader; and
wherein the sensor, using the NFC reader, reads out information from the NFC tag and sends at least a part of the information to the control assembly.

9. The method of claim 7, wherein the control assembly automatically selects the respective mounting-position-specific calibration data set based on the identification feature.

10. The method of claim 1, wherein a user selects the respective mounting-position-specific calibration data set from an input unit an agricultural production machine in order for the control assembly to access the respective mounting-position-specific calibration data.

11. The method of claim 1, wherein the control assembly additionally determines the working height from one or both of:
an agricultural attachment-specific calibration data set, the agricultural attachment-specific calibration data set comprises kinematics of a particular attachment; or
a coupling data set, the coupling data set comprises machine parameters of a device interface between an agricultural production machine and the particular attachment; and
wherein the control assembly additionally determines the working height from the coupling data set, the coupling data set comprises machine parameters of a three-point power lifter.

12. The method of claim 1, wherein the control assembly performs a calibration routine in which the control assembly:
generates the respective mounting-position-specific calibration data set; and
saves in the respective mounting-position-specific calibration data set one or more of: a reference height in reference to a height of the respective mounting position, an orientation of the sensor in the respective mounted state at a particular mounting position, or a location of the respective mounting position relative to the respective agricultural attachment.

13. The method of claim 12, wherein the control assembly, in the calibration routine, uses the sensor to measure a distance of the sensor to ground and saves it as the reference height.

14. The method of claim 12, wherein the control assembly guides a user through the calibration routine using an output unit in a natural language dialog;
wherein with regard to the respective mounting position:
the control assembly specifies the respective mounting position to the user; or
the user transmits the respective mounting position to the control assembly;
wherein with regard to a working height of the respective agricultural attachment:
the control assembly specifies the working height of the respective agricultural attachment to the user; or
the user transmits a setting of the working height of the respective agricultural attachment; and
wherein the control assembly instructs the user to park one or both of an agricultural production machine or the respective agricultural attachment on level ground.

15. The method of claim 12, further comprising parking one or both of an agricultural production machine or the agricultural attachment on level ground without modification to any supporting wheels;
wherein, after parking the one or both of an agricultural production machine or the agricultural attachment on level ground, during the calibration routine, a user mounts the respective sensor holder at the respective mounting position on the respective agricultural attachment and connects the sensor to the respective sensor holder; and
wherein the control assembly performs the calibration routine in which the control assembly determines a reference height and generates the respective mounting-position-specific calibration data set.

16. The method of claim 12, wherein the control assembly saves in the respective mounting-position-specific calibration data set each of: a reference height in reference to the height of the respective mounting position, an orientation of the sensor in the respective mounted state at the particular mounting position, and a location of the respective mounting position relative to the respective agricultural attachment.

17. The method of claim 1, wherein the control assembly controls the working height; and
wherein the control assembly performs one or more of:
determines the working height as a difference between a measured distance of the sensor to ground and a reference height;
continuously determines the working height;
outputs the working height to an output unit for outputting to a user; or
adjusts a machine parameter of one or both of an agricultural production machine or the respective agricultural attachment based on the working height.

18. A sensor assembly for measuring a working height of a plurality of agricultural attachments, the sensor assembly comprising:
a control assembly;
a sensor; and
respective sensor holders configured for mounting at respective mounting positions on each of the plurality of respective agricultural attachments, the sensor, using the respective sensor holders, configured for reversibly mounting at the respective mounting positions on different respective attachments;
wherein the control assembly is configured to determine the working height of the respective agricultural attachment of the plurality of respective agricultural attachments from a respective calibration data set specific to the respective mounting position on the respective agricultural attachment by:
receiving at least a part of measured data from the sensor in a respective mounted state on the respective sensor holder, wherein the measured data from the sensor recording, in a respective mounted state on the respective sensor holder, the measured data relating to a working height of the respective agricultural attachment;
automatically accessing a respective mounting-position-specific calibration data set, the respective mounting-position-specific calibration data set comprising calibration data specific to the respective mounting position on the respective sensor holder for the respective agricultural attachment;
automatically determining the working height of the respective agricultural attachment from the respective mounting-position-specific calibration data set specific to the respective mounting position on the respective sensor holder for the respective agricultural attachment; and
automatically controlling, responsive to determining the working height of the respective agricultural attachment, the respective agricultural attachment.

19. The sensor assembly of claim 18, wherein the sensor is configured for mounting on the respective sensor holder in one or both of a form fit or force fit.

20. The sensor assembly of claim 19, wherein the sensor is configured for mounting on the respective sensor holder with one or more of: using a quick-locking device; using one or more screws; using a magnetic connection; or is clipable in the respective sensor holder; and
wherein the respective sensor holder has one or both:
one or both of a battery or an electrical connection unit for connection to the control assembly; or
configured for transmitting energy from an agricultural production machine to the sensor with the electrical connection unit configured for an ISOBUS or CAN bus connection.

* * * * *